UNITED STATES PATENT OFFICE.

MARY CORA BLAND, OF CHICAGO, ILLINOIS.

IMPROVEMENT IN COMPOUNDS FOR POLISHING METALS, GLASS, &c.

Specification forming part of Letters Patent No. 129,708, dated July 23, 1872.

*To all whom it may concern:*

Be it known that I, MARY CORA BLAND, of the city of Chicago, county of Cook and State of Illinois, have invented a new and useful Compound for Polishing Silver, Gold, and other Metals, and Glass and other Materials.

This compound I call Lybian Silver Polish; and I do hereby declare that the following is a full, clear, and exact description thereof.

My invention consists in making a compound that, when applied to the surface of silver, gold, and other metals, and glass and other materials, and applying friction, the grease, dirt, and other foreign substances are easily and quickly removed, leaving the surface finely polished.

My compound is composed of olive-oil, spirits of ammonia, chalk, prepared or otherwise, and water, distilled or otherwise, in about the following proportions: One pound of olive-oil, one pound of spirits of ammonia, two pounds of chalk, prepared or otherwise, and one pound of water, distilled or otherwise.

The olive-oil and spirits of ammonia are mixed together, forming a chemical compound, and then the water is mixed with this compound, and then the chalk is added and mixed, the whole being of the consistency of a thick paste.

This compound is applied with a brush or cloth, and friction applied, and a chamois-cloth used afterward or not, as desired.

I do not confine myself to the precise proportions of the ingredients herein mentioned, as they may perhaps be varied and still answer the same purpose.

Having thus fully described my invention, what I claim as new, and desire to secure by Letters Patent, is—

The within-described compound, consisting of olive-oil, spirits of ammonia, water, distilled or otherwise, and chalk, prepared or otherwise, and used for the purposes set forth.

MARY CORA BLAND.

Witnesses:
F. J. SEYBOLD,
GEORGE S. BENTON.